United States Patent Office 3,417,296
Patented Dec. 17, 1968

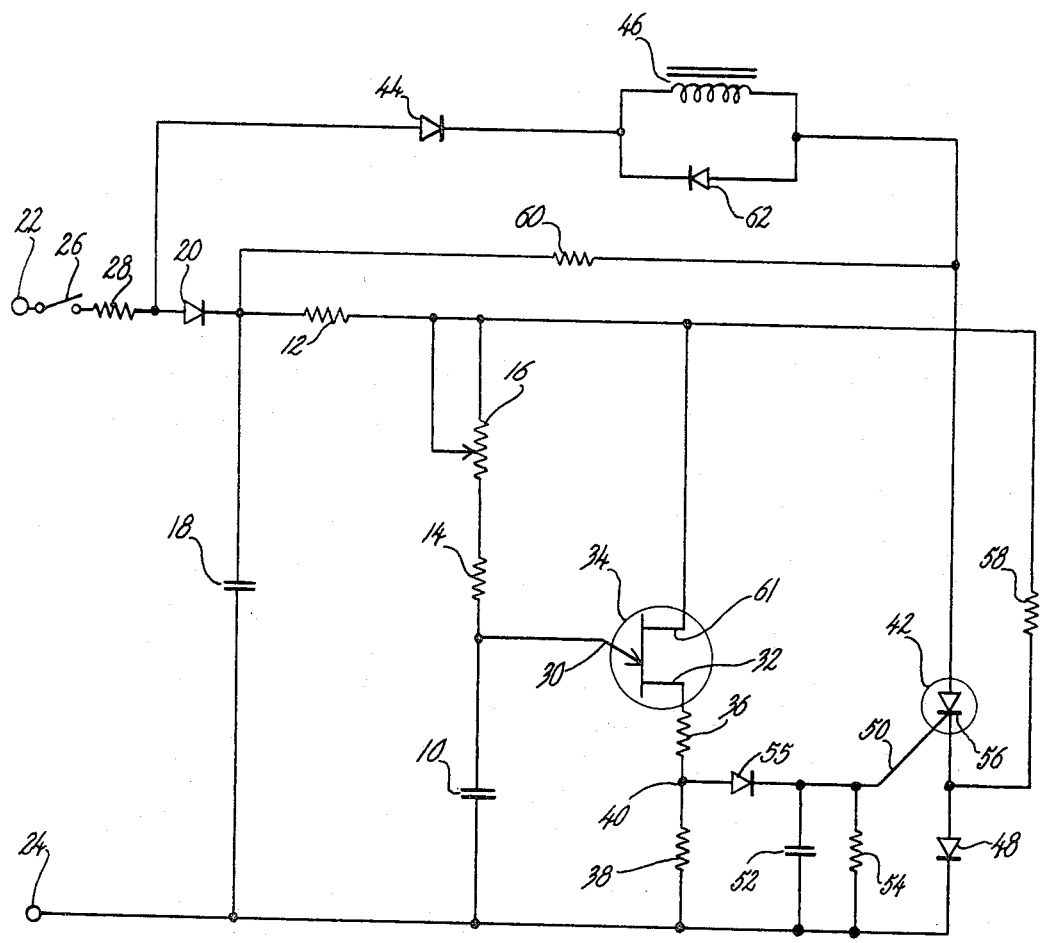

3,417,296
ELECTRONIC TIMER CIRCUIT
Klaus Wallentowitz, Waterbury, Conn., assignor to General Time Corporation, New York, N.Y., a corporation of Delaware
Continuation-in-part of application Ser. No. 405,503, Oct. 21, 1964. This application Oct. 25, 1966, Ser. No. 589,336
3 Claims. (Cl. 317—142)

ABSTRACT OF THE DISCLOSURE

An electronic timer circuit for energizing a relay from half-wave rectified unfiltered current. A first rectifier and filter provides continuous direct current for energizing a timer producing a positive output pulse. A second circuit including a separate rectifier in series with the relay winding and a controlled rectifier is connected across the AC supply terminals, to provide half-wave rectified unfiltered energization of the winding. An oppositely poled diode is shunted across the winding to provide holding current during the missing half cycles. The positive timing pulse is applied to the trigger electrode of the controlled rectifier. A separate connection from the filtered direct current supply to the anode of the controlled rectifier provides a small holding current during the missing half cycles.

This application is a continuation-in-part of my United States patent application Ser. No. 405,503, filed Oct. 21, 1964, entitled, "Electronic Timer Circuit." The invention is also closely related to the United States patent applications of Robert S. Lundin, Ser. No. 472,944, filed July 19, 1965, entitled, "Condition Responsive Input Controllers"; Ser. No. 479,553, filed Aug. 13, 1965, entitled, "Condition Responsive Process Timer"; and an application entitled, "Relay Circuit for Half-Wave Alternating Current Energization and Electronic Timer Employing the Same," filed herewith. All of the above applications are assigned to the assignee of the present application and are incorporated herein by reference.

This application relates to an electronic timer circuit. More particularly, it relates to an electronic timer circuit for measuring time delays in the order of one to ten seconds.

The present invention discloses an electronic timer circuit for connection to an alternating current source in which a resistor capacitor series circuit is supplied with half-wave rectifier power therefrom for charging the capacitor. The charging time of the capacitor determines the time delay provided by the timer. The capacitor of the electronic timer circuit is connected in circuit with the emitter and base 1 of a uni-junction transistor and a pair of electrical resistors. When the voltage on the capacitor exceeds the emitter to base bias on the uni-junction transistor, it fires and the emitter to base becomes an essentially short circuit. The capacitor is then discharged through the two resistors. The voltage developed across at least one of the resistors is used to trigger a silicon-controlled rectifier (SCR).

A novel feature of the invention is that the silicon-controlled rectifier controls a relay connected in series therewith, the relay circuit being supplied with unfiltered half-wave rectified alternating current only.

There is also disclosed in the present application a relay circuit facilitating the operation of an output relay on half-wave rectified alternating current, which comprises connecting a diode across the relay coil. This invention is claimed in the above-identified co-pending application of Robert S. Lundin filed concurrently herewith.

Since the silicon-controlled rectifier is thus also supplied with half-wave rectified alternating current energization, an anode to cathode bias is supplied to it from a small filter capacitor in a separate half-wave timing supply. The holding current in the silicon-controlled rectifier is small. Therefore a capacitor and resistor are connected in parallel between its trigger and cathode. This circuit insures that the SCR will fire even though the holding current is small.

Many electronic timers have been devised according to the prior art for specific applications. Some of these are disclosed and discussed in the above-identified co-pending applications. If an electronic timer circuit is desired for a specific application, a circuit according to the prior art can be chosen to efficiently meet those requirements at the lowest possible cost. However, if the number of timers to be used in the specific application is small, oftentimes the cost of the engineering time required in designing a minimum cost circuit vastly exceeds the resulting circuit cost saving. On the other hand, a timer circuit can be designed according to the prior art which meets a wide variety of stringent specifications and can be employed in nearly all applications. However, these timer circuits are relatively expensive.

Desirable qualities in general purpose electronic timer circuits are timing accuracy, quick reset, little effect on accuracy when timing cycles are quickly repeated and low cost. A low cost timer must normally use a relay output to control a large current. To reduce the number of non-linear and amplifying elements, it is desirable to use an SCR to control the relay. Prior art SCR timer circuits have been relatively expensive because they operated off full wave filtered rectifier supplies.

Another major cost element in prior art timers are the capacitors employed. The larger the total capacitance, the higher the cost. According to the prior art a large timing capacitor or an amplifier stage is required to trigger an SCR. Also, a full wave direct current supply or a large filter capacitor is required to provide a large holding current to the SCR to insure fast switching thereof. This increases cost. Also a large timing capacitor has a large leakage current adversely affecting timing accuracy. Furthermore, large capacitors in the circuit require larger discharge times and adversely affect repeat accuracy and reset time.

A disadvantage of prior art timer relay circuits is that the relays are connected into filtered direct current or to filtered half-wave supplies. If it is desired to abort a timing operation before energization of the relay, the stored energy in the filtered supplies will often momentarily energize the relay. This can be more than a nuisance if, for example, the relay is to operate an explosive charge.

The above-identified co-pending application of Robert S. Lundin filed herewith discloses a relay circuit that can be operated off half-wave rectified alternating current.

It is, therefore, an object of the present invention to provide an electronic timer circuit.

Another object of the invention is to provide an electronic timer circuit providing relatively broad application at low cost.

A further object of the invention is to provide an electronic timer circuit of the above character for operation from an alternating current supply.

Still another object of the invention is to provide an electronic timer circuit of the above character having good timing accuracy.

Yet another object of the invention is to provide an electronic timer circuit of the above character having a quick reset time.

A further object of the invention is to provide an electronic timer circuit of the above character having good repeat accuracy.

A still further object of the invention is to provide an electronic timer circuit of the above character having a minimum number of non-linear and amplifying elements.

A yet further object of the invention is to provide an electronic timer circuit of the above character using small capacitances.

Another object of the invention is to provide an electronic timer circuit of the above character using an SCR to control a relay output.

Still another object of the invention is to provide an electronic timer circuit of the above character providing a positive abort feature.

Yet an other object of the invention is to provide an electronic timer circuit of the above character employing the relay circuit of the above-identified Lundin application filed herewith.

A further object of the invention is to provide an electronic timer circuit of the above character employing only half-wave rectification.

Other objects of the invention will in part be obvious and will in part appear hereinafter.

The invention acordingly comprises the features of construction, combinations of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which the sole figure is a schematic electrical circuit diagram of a preferred embodiment of my invention.

Now referring to the drawing, the timing determining elements of my invention comprise a capacitor 10, voltage dropping resistor 12, fixed resistor 14 and potentiometer 16 connected in series as shown, as is conventional in many prior art electronic timer circuits. The timing elements 10, 12, 14 and 16 are connected across a filter capacitor 18 of a half-wave rectifier, comprising rectifier 20 and capacitor 18. These are in turn connected in series with AC supply terminals 22, 24, control switch 26 and a surge protecting resistor 28.

The timing cycle is initiated by closing switch 26. The filtered direct current from the half-wave rectifier charges the capacitor 10. Since the capacitor is connected in circuit with the emitter 30, "base 1" 32 of a uni-junction transistor 34, and resistors 36 and 38, no current will flow from emitter 30 to base 32 until the potential across capacitor 10 exceeds the reverse bias on the emitter to base 32 junction. The junction is then turned ON and the capacitor 10 is discharged through resistors 36 and 38. The potential then developed at terminal 40 triggers an SCR, generally indicated at 42.

It is a feature of the present invention that the SCR is operated from a half-wave rectified AC source. Its circuit can be traced from terminal 22 through switch 26, resistor 28, rectifying diode 44, relay coil 46 and diode 48 back to terminal 24, diodes 44 and 48 providing the half-wave rectification. According to the invention, means are provided for extending the triggering pulse applied to the trigger 50 of the silicon-controlled rectifier 42. This means comprises a capacitor 52 and resistor 54 providing a relatively long discharge time constant. This may be just long enough to trigger SCR 42 if no holding circuit is provided therefor. This circuit is isolated from uni-junction transistor 34 by diode 55.

In order to maintain SCR 42 in its conducting state during the negative half cycle of the AC supply line, and to insure fast triggering, I connect resistor 60 as shown. During the negative half cycles, the energy stored in the capacitor 18 positively biases the SCR 42 through a circuit comprising resistor 60, SCR 42, and diode 48.

The capacitor 18 may have a relatively low value in my circuit and provides relatively low holding current to SCR 42. This is because the integration of the trigger pulse provided by capacitor 52 and resistor 54 insures that the SCR 42 will fire at low current values. Since capacitor 18 is small it stores little energy and the timer circuit is rapidly reset. Furthermore, capacitor 18 discharges rapidly so that un-junction 34 is rapidly reset to its OFF condition for another timing cycle.

The relay 46 continues to be energized through the negative half cycle since the energy stored therein causes a current to flow through diode 60 connected thereacross, providing a self-energizing current to the coil 46.

Diode 48 provides a bias to the cathode 56 of SCR 42 and also provides protection against transients and noise.

Since I provide the relay circuit with an unfiltered supply, the only energy stored therein is in the relay itself and a quick reset is provided.

The values of the components in the circuit shown in the drawing are as follows:

Resistor 28 is 10 ohms; resistor 12, 47 kilohms; potentiometer 16, 500 kilohms; resistor 14, 10 kilohms; resistor 36, 10 ohms; resistor 38, 47 ohms; resistor 54, 1 kilohm; and resistor 58, 47 kilohms. All of the above resistors are rated at one-half watt. Resistor 60 is 22 kilohms rated at one watt. Diodes 44 and 62 are each type DE200, supplied by Semiconductor Products. Relay 46 may be a 48 volt DC relay supplied by Potter and Brumfield. Diodes 55 and 48 may be type DE50, and diode 20 a type DE300 supplied by Semiconductor Products. SCR 42 is a General Electric type C106B and uni-junction 34 a Texas Instruments type S43. Capacitor 18 is a 1 microfarad 200 volt capacitor. Capacitor 10 is a 20 microfarad 50 volt aluminum electrolytic capacitor and capacitor 52 is .1 microfarad.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention, which, as a matter of language, might be said to fall therebetween.

Having described my invention, what I claim as new and desire to secure by Letters Patent is:

1. An electronic timer circuit comprising:
   (A) a controlled rectifier having anode and trigger electrodes and having a cathode electrode connected to a first AC supply terminal;
   (B) a first series circuit energized by half-wave rectified unfiltered current and connecting said anode of said controlled rectifier to a second AC supply terminal, said first series conduit including
      (1) a relay winding, and
      (2) a first diode poled for passing positive pulses at said second terminal through said winding and said rectifier;

(C) a second diode shunted across said winding and poled in the opposite direction;
(D) rectifier means separate from said first diode for supplying to a direct current terminal a filtered direct current derived from said AC terminals;
(E) timing means energized from said direct current terminal for applying a positive signal pulse to said trigger electrode at the end of a given time interval; and
(F) a resistor connecting said anode to said filtered direct current terminal to provide a small continuous holding current through said controlled rectifier.

2. The timer circuit defined in claim 1, wherein said rectifier means comprises a small filter capacitor connected between said direct current terminal and said first AC supply terminal.

3. The timer circuit defined in claim 2, wherein said capacitor has a value of substantially 1 microfarad.

References Cited

UNITED STATES PATENTS 3,333,175  7/1967  Klyce _____ 317—142 X

LEE T. HIX, Primary Examiner.

U.S. Cl. X.R.

307—252, 293; 317—148.5